Dec. 17, 1957 T. H. STANLEY 2,816,960

RECEIVER FOR CARRIER TELEPHONE SYSTEMS

Filed Nov. 17, 1954

Inventor Thomas H. Stanley by Ward, Neal, Haselton, Orme & McElhannon

Attorneys

United States Patent Office 2,816,960
Patented Dec. 17, 1957

2,816,960

RECEIVER FOR CARRIER TELEPHONE SYSTEMS

Thomas H. Stanley, Ryde, New South Wales, Australia, assignor to T. S. Skillman and Company Pty. Limited, Cammeray, near Sydney, Australia, a corporation of New South Wales Application November 17, 1954, Serial No. 469,511
10 Claims. (Cl. 179—15.5)

Figures 1, 2A, 2B:
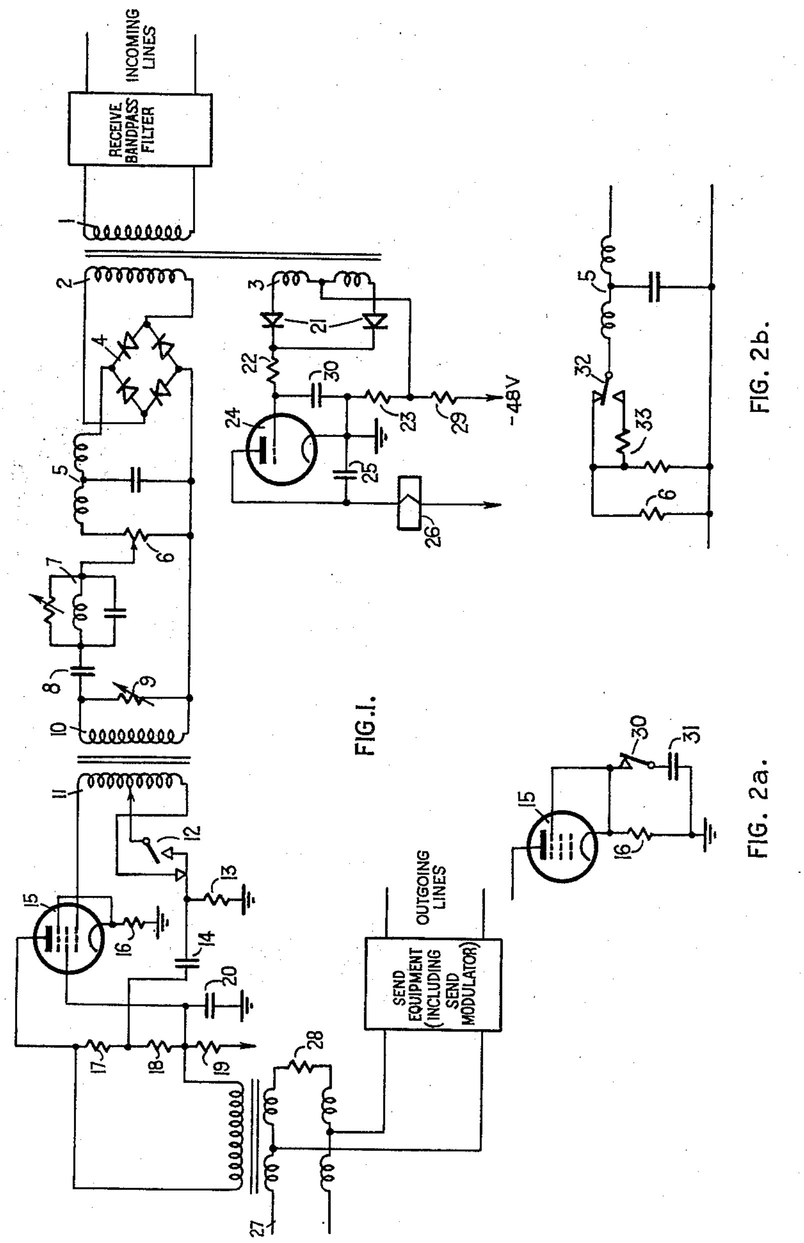

This invention relates to carrier wave transmission systems of the type in which control signals are conveyed by changes in the level of a transmitted carrier wave, and provides an improved receiver for use in such systems. The receiver is especially suitable where so-called miniature components are employed, but its usefulness is not confined to that field.

A system of the abovementioned type is described in U. S. Patent No. 2,564,378. A brief outline of the principles upon which it operates is given here to assist understanding of the present invention.

The making of a call in a modern telephone system necessitates that certain signals, as well as conversation be conveyed from a calling circuit into a called circuit, and vice versa. The calling circuit is the circuit linking the calling subscriber with his exchange, the called circuit is the circuit linking the called subscriber with his exchange, and in the ordinary case signals and conversation are conveyed from the one circuit to the other by a D. C. junction, which is a metallic connection capable of transmitting direct current for signals and voice frequency currents for conversation.

The usual signals to be conveyed from the calling circuit to the called circuit and vice versa are the "call" signal (transmitted in the forward direction to indicate that call has been initiated), the "supervisory" signal (transmitted in the backward direction to indicate that the called subscriber has answered), and either the "forward clear" or "backward clear" signal (to indicate that one of the subscribers has terminated the call). Where a D. C. junction is used, these signals are normally conveyed by changes in the steady state of direct current. The "call" signal, for example, is commonly given by a change from a negligible flow of direct current to a greatly increased flow of direct current in the forward direction, the "supervisory" signal by a reversal of the polarity of said increased flow of direct current, and the "clear" signal by a reversion from such greatly increased flow of direct current to a negligible flow thereof. The extent of the change usually depends on the necessity to bring a signalling relay into either the operated or the non-operated condition.

In the systems to which this invention relates the connecting link between exchanges is not a D. C. junction, but a carrier communication circuit. A signal which exists in the calling circuit as a certain steady state of direct current appears in the junction circuit as a certain steady state of transmitted carrier and in the called circuit as a steady state of direct current once more. In such systems the "call" signal is commonly transmitted through the junction circuit by a change from zero to full strength transmitted carrier in the forward direction, the "supervisory" signal by a change from low level to full strength transmitted carrier in the backward direction, and each "clear" signal by a change from full strength to zero transmitted carrier in the appropriate direction. The transmission of low level carrier in the backward direction in the interval between the "call" and "supervisory" signals is necessitated by the requirement that "dial tone" and "ringing tone," for example, and in some circumstances operator's conversation, shall be conveyed back to the calling circuit during this interval.

It is the requirement just mentioned which introduces into such systems the problems to which the present invention is directed. Consider transmission in the backward direction, between "call" and "supervisory" signals. Carrier is transmitted at low level, so that it will be available for the detection of signals but not effective to operate a "supervisory" relay at the calling end. The signals are modulated in a suppressed-carrier modulator, the low-level transmitted carrier is added to the line after the modulator, and the signal sideband and low-level carrier together enter a detector at the calling end. The level of the signal sideband must be kept below the level of the carrier to avoid distortion in the detector and to prohibit operation of the "supervisory" relay by the signal sideband. After the "supervisory" signal, however, when the carrier is raised from low-level to full strength, the level of the transmitted sideband to line is also raised, to improve the signal to noise ratio of the channel for subscriber to subscriber conversation. To maintain the gain uniform in all conditions, attenuating means in the backward path at the calling end of the junction are switched into circuit when the "supervisory" signal is given. In systems not making use of the present invention, these attenuating means have included the channel equalizing means, so that equalization has not been provided in the backward direction during the interval between "call" and "supervisory" signals. In addition, the channel equalizing means have been located between the channel amplifier and the hybrid network, and the power lost in the equalizer has necessitated a rather high power output from the amplifier. This latter circumstance is disadvantageous in so called "miniaturized" systems, since the restricted size of such systems requires heat dissipation to be kept to a minimum. A further factor, of interest in relation to the present invention, is that in the systems so far proposed or used it has been found necessary in the high level condition, in order to operate the "supervisory" relay as well as drive the channel amplifier, to maintain a high input level to the receive band pass filter of a channel. This has required the use of air-cored coils in the early stages of that filter to avoid saturation and resulting distortion. The use of such coils, which are inevitably bulky, is especially disadvantageous in "miniaturized" systems.

The present invention overcomes the abovementioned disadvantages. It provides a receiver circuit which enables the input level to the receive bandpass filter of a channel to be kept comparatively low, so that iron-cored coils can be used in that filter, and which enables the channel equalizing means to be located on the input side of the channel amplifier so that (1) Equalization without significant reduction in planning level is provided in the backward direction both before and after the supervisory signal has been given, and (2) The channel amplifier itself, since it need not develop power which is to be subsequently lost in the equalizer, may employ a higher-gain but lower-powered type tube dissipating comparatively little heat.

The invention finds application in a carrier telephone system in which steady carrier current and, when needed, a sideband containing voice frequency components are transmitted over a channel in the backward direction at relatively low level prior to a call being answered and at relatively high level when a call has been answered, and consists in receiving apparatus associated with said channel at the calling and comprising: a filter adapted to select said carrier current and sideband; a transformer having a primary winding connected with said filter, a first secondary winding being a high impedance winding and a second secondary winding being a low impedance winding; a supervisory relay in a circuit connected with said first secondary winding, said supervisory relay being operated only when a call has been answered and the carrier current is transmitted at relatively high level; in a circuit connected with said second secondary winding a detector, a channel amplifier, and channel equalizing means interposed between said detector and said channel amplifier; and contact means operable by said supervisory relay to vary the output level of said channel amplifier in a manner to compensate for the different levels at which the sideband is transmitted before and after a call has been answered.

In the accompanying drawings—

Fig. 1 shows a circuit diagram of an embodiment of the invention;

Figs. 2*a* and 2*b* show alternative structures for portions of the circuit shown in Fig. 1.

Referring to Fig. 1, transmitted carrier (at either high or low level) and the speech sideband (at either high or low level) come from the called end to the receive bandpass filter and thence to the primary 1 of the input transformer. This transformer has two secondary windings 2 and 3.

Winding 3 is a high impedance winding, which may for example have a turns ratio to the primary of 20:1, and is included in the grid circuit of the tube 24, in the anode circuit of which is the "supervisory" relay 26. The operation of relay 26 will be described later, and it is sufficient for the moment to say that the relay is operated when carrier is transmitted from the called end at full strength but is not operated when it is transmitted at low level.

Winding 2 is a comparatively low impedance winding, which may for example have a turns ratio to the primary of 4:1. The circuit of winding 2 includes the detector 4, low pass filter 5, shunt resistance 6 (which, because of the high impedance seen looking into winding 10, effectively terminates the circuit), and components 7, 8 and 9 which together with the input transformer of the channel amplifier, form the channel equalizing means. In a typical case windings 1 and 2 gave a 150 ohms to 2400 ohms transformation, and resistor 6 was of 2400 ohms.

Condenser 8 has a dual function in the particular circuit illustrated. It forms part of the equalizing means, and it also serves to block from winding 10 the D. C. component of the current passed by detector 4 and low pass filter 5.

The channel equalizing means are of the type utilizing high and low frequency resonances involving the input transformer of the channel amplifier. The comparatively low impedance of this section of the circuit makes it practicable to include in it these channel equalizing means, the dimensions of the equalizer components being quite manageable. The principles underlying this type of equalizer, which can introduce considerable departures from uniformity of gain-frequency characteristic whilst maintaining substantially unreduced the average effective gain over the band, are discussed in "Network Analysis and Feedback Amplifier Design," by H. W. Bode (D, Van Nostrand Company, Inc., 1945) at chapter 16. The detailed design procedures provided by Bode's work are not always as economic as "cut and try" methods, and frequently in practice equalizing networks are left with some adjustable reactive components as well as the adjustable damping components indicated at 7 and 9 of the drawing. This type of equalizer has the advantage that, since the average effective impedance ratio (and so the voltage amplification), over the wanted frequency band, of the amplifier input circuit is substantially unaltered by the presence of the equalizing components, the average channel planning level at the hybrid is likewise substantially unaltered thereby. In a typical case there was a gain of about 8 db at low frequencies (condenser 8 and winding 10 form a series resonant circuit), a loss of about 1 db at mid-frequencies, and a slightly larger loss at the higher frequencies. This resembles the example worked out by Bode and shown in Fig. 16.35 of the above cited reference, with the exception that the high and low frequencies are exchanged. It is sometimes necessary to adjust the circuit to give a peak of gain at both the high frequency and low frequency ends of the band. The use of any other type of equalizer would introduce at least 8 db, and in practice probably 10 db, of insertion loss. It would be possible, by following Bode's procedure strictly, to reduce the loss of gain slightly below the 1 db actually obtained, but this would require dispensing with the adjustable resistances 7 and 9, with consequent loss of flexibility.

The circuit just described—that is the circuit between winding 2 and winding 10—makes no discrimination between the high level signals it receives after the "supervisory" signal and the low level signals it receives prior to that signal. Discrimination between the two levels of signals is made, however, in the circuit of winding 11, which is the secondary winding of the input transformer to the channel amplifier (winding 10 being the primary winding of that transformer). The top of winding 11 is connected to the grid of tube 15, while either a mid-point or the bottom of the winding (depending on the position of contact 12) is connected over resistor 13 to earth. Contact 12 is a contact of relay 26, and is operated when high-level carrier is being received (i. e. after the "supervisory" signal) to inject only part of the voltage developed across winding 11 into the grid circuit of tube 15, whereas when low-level carrier is being received (i. e. before the "supervisory" signal) contact 12 is in the position illustrated and the whole of the voltage developed across winding 11 appears in the grid circuit.

The cathode of tube 15 is connected via resistor 16 to ground, and the anode is connected via the primary winding of hybrid transformer 27 (shunted by a high impedance voltage dividing network comprised of resistors 17 and 18) and resistor 19 to a source of suitable positive potential. The suppressor grid is connected directly to the cathode, and the screen grid is connected via the resistor 19 to the source of positive potential. Condenser 20 is the normal de-coupling condenser of large value. Tube 15 obtains negative feed-back from the unbypassed cathode resistor 16 and additionally by the connection of plate and grid circuits through condenser 14. The hybrid transformer 27, branching to the subscriber's V. F. line (terminated by resistor 28) and to the send modulator input is preferably of the air gap type to avoid saturation due to the presence of the steady D. C. current of tube 15 in its primary winding.

The features to which attention is particularly directed in the circuit just described are:

(1) The contact 12, which as described above is a contact of the "supervisory" relay 26 and compensates for the varying levels of input signals to the channel amplifier.

(2) The fact that, this compensation having been made at the input to the amplifier, no attenuating means need be inserted in the output of the amplifier in the high level condition and tube 15 can be a high gain low powered tube dissipating comparatively little heat.

(3) The fact that the channel equalizing means are inserted in the input circuit to the amplifier, this being made possible by the comparatively low impedance of the circuit connected with winding 2 and by the use of a type of equalizer which has negligible insertion loss.

To return now to the operating circuit for the "supervisory" relay 26, that is the circuit containing winding 3, tube 24 and relay 26 itself. When no signal is applied to winding 3, tube 24 has a grid bias equal to the voltage dropped across resistor 23. In a typical case, resistor 23 had a value of 5000 ohms and resistor 29 of 20000 ohms, the normal grid bias being in consequence approximately −10 volts. In this condition the anode current is negligible and relay 26 is not operated. The alternating voltages applied to winding 3 may be either low level carrier plus low level sideband or high level carrier plus high level sideband, depending on whether or not the supervisory signal has been given. Rectifiers 21 form a full wave rectifying circuit for the applied voltages which in consequence apply a steady positive potential to the grid to counteract the normal negative bias developed across resistor 23. The value of this steady positive potential depends on whether the received signals are at high or low level. At high level, the circuit is so arranged that the resulting grid bias causes sufficient anode current to flow to operate the "supervisory" relay 26. At low level, the resulting grid bias is more negative than it is with high level input and the anode current is insufficient to operate the relay. Condenser 30 and resistor 22 form a circuit with a sufficiently large time constant to prevent false operation of relay 26 by peaks of applied voltage in the low level condition. Resistor 22 in addition restricts the flow of grid current should the grid bias become at any moment positive during the high level condition. Winding 3, because of its high turns ratio to the primary 1 and the large grid-cathode impedance of tube 24, consumes negligible power from the input transformer and can be virtually disregarded in the design of the circuit connected with winding 2. The input level to the channel band pass filter (preceding winding 1) can consequently be comparatively low and it is possible to dispense with the use of air-cored coils in the early stages of that filter.

In systems so far proposed or used the same circuit (corresponding to the circuit connected with winding 2 in the attached drawing) has been used to operate both the channel amplifier (corresponding to tube 15) and the signal amplifier (corresponding to tube 24). The circuit has of necessity been of high impedance, making it impracticable as mentioned before to include in it the channel equalizing means, which means have of necessity been included in the output of the channel amplifier. The channel has been unequalized in the low level condition, the channel amplifier has had to be of the power amplifying type with comparatively large heat dissipation, and the input level to the channel bandpass filter has been necessarily high, increasing the bulk of that filter. It will be apparent from the preceding description that the receiver according to the present invention overcomes these disadvantages, providing an equalized channel in both high and low level conditions and providing improved possibilities for "miniaturisation."

The receiver illustrated in the accompanying drawing is for use (in the normal type of system discussed earlier) at the calling end, since it is from the called end to the calling end that two levels of carrier are transmitted. The same receiver can be used with slight modification, at the called end. For such use contact 12 is taken out of circuit and the midpoint of winding 11 is connected directly to the top of resistor 13 since the sideband will be received always at high level so that part only of winding 11 is required in the grid circuit of tube 15. In addition condenser 30 (between grid and cathode of tube 24) is replaced by an open circuit and a high speed dialling relay is substituted for "supervisory" relay 26. The receiver is then in a condition to receive the "call" signal, dialling pulses, and conversation. The above mentioned modifications can be conveniently made by changing one plug-in unit for another. By this change, and a corresponding change in the sending equipment, the direction of operation of any channel can be conveniently reversed.

Compensation for the varying levels at which the sideband is received, which is effected by contact means controlled by the supervisory relay 26, need not necessarily be made at the input transformer to the amplifier.

Fig. 2*a* shows alternative means for effecting this compensation. A condenser 31 adapted to by-pass the cathode resistor 16 of channel amplifier tube 15, is switched in and out of circuit by contact 30 controlled by supervisory relay 26, and the gain of the amplifier is thus altered. Fig. 2*a* illustrates the low level condition. Contact 30 is closed, resistor 16 is by-passed by condenser 31, and the gain of the amplifier is greater than it would be with contact 30 open.

Fig. 2*b* shows a further alternative structure for effecting this compensation. Half-section pad 33 is provided between low-pass filter 5 and shunt resistance 6, and is adapted to be switched in and out of circuit by contact 32 under control of supervisory relay 26. Pad 33 presents the same impedance, looking towards the shunt resistance 6, as that shunt resistance. Fig. 2*b* illustrates the low-level condition. Pad 33 is out of circuit. In the high level condition it is in circuit and the attenuation it introduces compensates for the higher level received from the incoming line.

I claim:

1. In a carrier telephone system in which steady carrier current and, when needed, a sideband containing voice frequency components are transmitted over a channel in the backward direction at a relatively low level prior to a call being answered and at a relatively high level when a call has been answered, receiving apparatus associated with said channel at the calling end comprising: a filter adapted to select said carrier current and sideband; a transformer having a primary winding connected with said filter, a first secondary winding being a high impedance winding and a second secondary winding being a low impedance winding; a supervisory relay in a circuit connected with said first secondary winding, said supervisory relay being operated only when a call has been answered and the carrier current is transmitted at relatively high level; a detector connected with said second secondary winding; a channel amplifier; channel equalizing means interposed between said detector and said channel amplifier; and contact means operable by said supervisory relay to vary the output level of said channel amplifier in a manner to compensate for the different levels at which the sideband is transmited before and after a call has been answered.

2. Receiving apparatus as claimed in claim 1 in which said circuit comprises a valve having an anode and a grid, means connected to said grid for providing a large normal negative grid bias, and full wave rectifying means connecting said first secondary winding to said grid of said valve, said rectifying means being poled so that voltages induced in said first secondary winding are applied to said grid in opposition to said normal negative grid bias and said supervisory relay being connected to said anode of said valve.

3. In a carrier telephone system in which steady carrier current and, when needed, a sideband containing voice frequency components are transmitted over a channel in the backward direction at relatively low level prior to a call being answered and at relatively high level when a call has been answered, receiving apparatus associated with said channel at the calling end comprising: a filter adapted to selected said carrier current and sideband; a transformer having a primary winding connected with said filter, a first secondary winding being a high impedance winding and a second secondary winding being a low impedance winding; a supervisory relay in a circuit connected with said first secondary winding, said supervisory relay being operated only when a call has been answered and the carrier current is transmitted at relatively high level; a detector connected with said second secondary winding; a channel amplifier connected to the output of said detector by an input transformer of high impedance ratio; channel equalizing means interposed between said detector and said channel amplifier and including said input transformer, said channel equalizing means being adapted to introduce considerable departures from uniformity of gain-frequency characteristic whilst maintaining substantially unreduced the average effective gain over the band; and contact means operable by said supervisory relay to vary the output level of said channel amplifier in a manner to compensate for the different levels at which the sideband is transmitted before and after a call has been answered.

4. Receiving apparatus as claimed in claim 3 in which said circuit comprises a valve having an anode and a grid, means connected to said grid for providing a large normal negative grid bias, and full wave rectifying means connecting said first secondary winding to said grid of said valve, said rectifying means being poled so that voltages induced in said first secondary winding are applied to said grid in opposition to said normal negative grid bias and said supervisory relay being connected to said anode of said valve.

5. In a carrier telephone system in which steady carrier current and, when needed, a sideband containing voice frequency components are transmitted over a channel in the backward direction at a relatively low level prior to a call being answered and at a relatively high level when a call has been answered, receiving apparatus associated with said channel at the calling end comprising: a filter adapted to select said carrier current and sideband; a transformer having a primary winding connected with said filter, a first secondary winding being a high impedance winding and a second secondary winding being a low impedance winding; a supervisory relay in a circuit connected with said first secondary winding, said supervisory relay being operated only when a call has been answered and the carrier current is transmitted at relatively high level; a detector connected with said second secondary winding; a channel amplifier connected to the output of said detector by an input transformer of high impedance ratio; channel equalizing means interposed between said detector and said channel amplifier and including said input transformer, said channel equalizing means being adapted to introduce considerable departures from uniformity of gain-frequency characteristic whilst maintaining substantially unreduced the average effective gain over the band; and contact means operable by said supervisory relay to vary the output level of said channel amplifier in a manner to compensate for the different levels at which a sideband is transmitted before and after a call has been answered, said contact means being adapted in the unoperated condition of said supervisory relay to connect part only of the secondary winding of said input transformer in the input circuit of said channel amplifier and in the operated condition of said supervisory relay to connect the whole of the secondary winding of said input transformer in the input circuit of said channel amplifier.

6. Receiving apparatus as claimed in claim 5 in which said circuit connected with said first secondary winding comprises a valve having an anode and a grid, means connected to said grid for providing a large normal negative grid bias, and full wave rectifying means connecting said first secondary winding to said grid of said valve, said rectifying means being poled so that voltages induced in said first secondary winding are applied to said grid in opposition to said normal negative grid bias and said supervisory relay being connected to said anode of said valve.

7. In a carrier telephone system in which steady carrier current and, when needed, a sideband containing voice frequency components are transmitted over a channel in the backward direction at a relatively low level prior to a call being answered and at a relatively high level when a call has been answered, receiving apparatus associated with said channel at the calling end comprising: a filter adapted to select said carrier current and sideband; a transformer having a primary winding connected with said filter, a first secondary winding being a high impedance winding and a second secondary winding being a low impedance winding; a supervisory relay in a circuit connected with said first secondary winding, said supervisory relay being operated only when a call has been answered and the carrier current is transmitted at relatively high level; a detector connected with said secondary winding; a channel amplifier having a cathode resistor and connected to the output of said detector by an input transformer of high impedance ratio; a condenser adapted when in circuit to bypass said cathode resistor; channel equalizing means interposed between said detector and said channel amplifier and including said input transformer, said channel equalizing means being adapted to introduce considerable departures from uniformity of gain-frequency characteristic whilst maintaining substantially unreduced the average effective gain over the band; and contact means operable by said supervisory relay to vary the output level of said channel amplifier in a manner to compensate for the different levels at which a sideband is transmitted before and after a call has been answered, said contact means being adapted in the unoperated condition of said supervisory relay to switch said condenser into circuit to bypass said cathode resistor of said channel amplifier and in the operated condition of said supervisory relay to switch said condenser out of circuit.

8. Receiving apparatus as claimed in claim 7 in which said circuit connected with said first secondary winding comprises a valve having an anode and a grid, means connected to said grid for providing a large normal negative grid bias, and full wave rectifying means connecting said first secondary winding to said grid of said valve, said rectifying means being poled so that voltages induced in said first secondary winding are applied to said grid in opposition to said normal negative grid bias and said supervisory relay being connected to said anode of said valve.

9. In a carrier telephone system in which steady carrier current and, when needed, a sideband containing voice frequency components are transmitted over a channel in the backward direction at a relatively low level prior to a call being answered and at a relatively high level when a call has been answered, receiving apparatus associated with said channel at the calling end comprising: a filter adapted to select said carrier current and sideband; a transformer having a primary winding connected with said filter, a first secondary winding being a high impedance winding and a second secondary winding being a low impedance winding; a supervisory relay in a circuit connected with said first secondary winding, said supervisory relay being operated only when a call has been answered and the carrier current is transmitted at relatively high level; a detector connected with said second secondary winding; a channel amplifier connected to the output of said detector by an input transformer of high impedance ratio; channel equalizing means interposed between said detector and said channel amplifier and including said input transformer, said channel equalizing means being adapted to introduce considerable departures from uniformity of gain-frequency characteristic whilst maintaining substantially unreduced the average effective gain over the band; a constant impedance resistive pad interposed between said detector and said channel equalizing means and adapted when in circuit to reduce the level of signals reaching said input transformer; and contact means operable by said supervisory relay to vary the output level of said channel amplifier in a manner to compensate for the different levels at which a sideband is transmitted before and after a call has been answered, said contact means being adapted in the unoperated condition of said supervisory relay to switch said resistive pad out of circuit and in the operated condition of said supervisory relay to switch said resistive pad into circuit.

10. Receiving apparatus as claimed in claim 9 in which said circuit connected with said first secondary winding comprises a valve having an anode and a grid, means connected to said grid for providing a large normal negative grid bias, and full wave rectifying means connecting said first secondary winding to said grid of said valve, said rectifying means being poled so that voltages induced in said first secondary winding are applied to said grid in opposition to said normal negative grid bias and said supervisory relay being connected to said anode of said valve.

References Cited in the file of this patent

UNITED STATES PATENTS

| | | |
|---|---|---|
| 2,264,397 | Moore | Dec. 2, 1941 |
| 2,564,378 | Skillman | Aug. 14, 1951 |